(12) United States Patent
Micciche et al.

(10) Patent No.: US 8,994,355 B2
(45) Date of Patent: Mar. 31, 2015

(54) DC-DC DOWN-CONVERTER WITH TIME CONSTANT COMPARISON REGULATION SYSTEM

(75) Inventors: Mario Micciche, Agrigento (IT);
Antonino Conte, Tremestieri Etneo (IT);
Carmelo Ucciardello, Catania (IT);
FrancescoNino Mammoliti, Riposto (IT)

(73) Assignee: STMicroelectronics S.r.l., Agrate Brianza (MB) (IT)

( * ) Notice: Subject to any disclaimer, the term of this patent is extended or adjusted under 35 U.S.C. 154(b) by 694 days.

(21) Appl. No.: 13/401,078

(22) Filed: Feb. 21, 2012

(65) Prior Publication Data
US 2012/0217947 A1 Aug. 30, 2012

(30) Foreign Application Priority Data
Feb. 28, 2011 (IT) .............................. MI2011A0309

(51) Int. Cl.
*G05F 1/575* (2006.01)
*H02M 3/07* (2006.01)

(52) U.S. Cl.
CPC .................................. *H02M 3/073* (2013.01)
USPC .............................. 323/288; 363/60; 327/157

(58) Field of Classification Search
CPC ... H02M 3/07; H02M 3/073; H02M 2003/07; G05F 1/575; G05F 1/613; G05F 1/614
USPC .......... 323/280, 282, 288; 327/155, 156, 157, 327/536; 363/59, 60, 65
See application file for complete search history.

(56) References Cited

U.S. PATENT DOCUMENTS

| | | |
|---|---|---|
| 2003/0038669 A1 | 2/2003 | Zhang |
| 2010/0090754 A1 | 4/2010 | Furuya et al. |
| 2010/0295835 A1 | 11/2010 | Kim et al. |
| 2012/0139516 A1* | 6/2012 | Tsai et al. ..................... 323/282 |

FOREIGN PATENT DOCUMENTS

WO WO-2009065050 5/2009

* cited by examiner

*Primary Examiner* — Adolf Berhane
*Assistant Examiner* — Jye-June Lee
(74) *Attorney, Agent, or Firm* — Allen, Dyer, Doppelt, Milbrath & Gilchrist, P.A.

(57) ABSTRACT

A voltage converter device includes a voltage regulator having a supply terminal for receiving a supply voltage and an output terminal for providing a regulated voltage. A voltage multiplier is for receiving the regulated voltage and providing a boosted voltage higher in absolute value than the regulated voltage. The voltage multiplier includes circuitry for providing a clock signal that switches periodically between the regulated voltage and a reference voltage, and a sequence of capacitive stages that alternately accumulate and transfer electric charge according to the clock signal for generating the boosted voltage from the regulated voltage. The voltage regulator includes a power transistor and a regulation transistor each having a first conduction terminal, a second conduction terminal and a control terminal.

20 Claims, 8 Drawing Sheets

US 8,994,355 B2

DC-DC DOWN-CONVERTER WITH TIME CONSTANT COMPARISON REGULATION SYSTEM

FIELD OF THE INVENTION

The present invention relates to the field of electronic devices. In particular, this invention relates to voltage converter devices.

BACKGROUND OF THE INVENTION

Electronic apparatuses (computers, cell phones, navigation systems, etc.) currently on the market include various electronic systems (computational logic, non-volatile memories, sensors, input/output interfaces etc.). In general, such electronic systems use operating voltages that vary considerably one from another. However, the electronic apparatus usually receives one supply voltage (typically provided by the power grid or by batteries). Consequently, the electronic apparatus includes an internal voltage regulator that is input with the supply voltage and outputs a regulated voltage adapted to supply some electronic systems (such as the computational logic), and a voltage multiplier (e.g., a charge pump) that is input with the regulated voltage and outputs a boosted voltage, higher in absolute value, and adapted to supply other electronic systems (such as the non-volatile memories).

Voltage converters often face the following drawbacks. The electronic systems connected to the charge pump absorb current in a discontinuous manner over time. Very often, such current absorption is characterized by absorption peaks, as it occurs in non-volatile memories during data writing. This may cause a sudden drop in the regulated voltage, with a negative effect on the performance of such electronic systems, possibly up to a malfunction thereof.

A known technique to overcome such drawbacks is to implement a feedback loop on the voltage converter through an operational amplifier having a very high response speed (for responding with enough speed to the power consumption peaks). However, this operational amplifier has very high power consumption.

Another known technique includes adding a stabilizing capacitor to the output terminal of the voltage regulator, so as to respond to the power consumption peaks through an electric charge stored therein. However, this technique involves a considerable amount of area consumption for implementing the stabilizing capacitor and electric power for maintaining it charged.

Another drawback is that the regulated voltage usually has a very low value (for correctly powering the corresponding electronic systems). Therefore, the charge pump has a rather bulky structure (e.g., with a large number of pumping stages) for obtaining the desired boosted voltage (very high) from the regulated voltage.

SUMMARY OF THE INVENTION

In general terms, one or more embodiments of the present invention are based on the idea of controlling the voltage regulator according to an equivalent capacity of the voltage multiplier.

More specifically, an embodiment of the invention provides a voltage converter device. The voltage converter device includes a voltage regulator having a supply terminal for receiving a supply voltage and an output terminal for providing a regulated voltage. Furthermore, the voltage converter device includes a voltage multiplier (e.g., a charge pump) for receiving the regulated voltage and for providing a boosted voltage higher in absolute value than the regulated voltage. The voltage multiplier includes means or circuitry for providing a clock signal that switches periodically between the regulated voltage and a reference voltage, and a sequence of capacitive stages that stores and transfers electric charge alternately according to the clock signal for generating the boosted voltage from the regulated voltage. The voltage regulator includes a power transistor and a regulation transistor each having a first conduction terminal, a second conduction terminal and a control terminal. The first conduction terminals of the power transistor and of the regulation transistor are connected to the supply terminal, and the second conduction terminal of the power transistor is connected to the output terminal.

The voltage regulator also includes feedback means connected to the second conduction terminal of the regulation transistor for providing at least one feedback signal, and regulation means or circuitry for controlling the control terminals of the power transistor and of the regulation transistor according to said at least one feedback signal. In an embodiment, the feedback means or circuitry includes capacitive means or circuitry having a capacity corresponding to an equivalent capacity of the voltage multiplier in operation as seen at the output terminal. Discharge means or circuitry are provided for discharging the capacitive means or circuitry to the reference voltage, and switching means or circuitry is provided for charging the capacitive means or circuitry by connecting them to the second terminal of the regulation transistor. The feedback means or circuitry also includes control means or circuitry for enabling the discharge means or circuitry and the switching means or circuitry in mutual exclusion according to the clock signal (e.g., for enabling the discharge means or circuitry and the switching means or circuitry in succession during each period of the control signal in phase with the clock signal—preferably with a period greater than the latter). Detection means or circuitry is provided for deriving the at least one feedback signal from the capacitive means or circuitry while the switching means or circuitry is enabled.

Another aspect provides a corresponding method. A further aspect provides an electronic apparatus including one or more of such voltage converter devices.

BRIEF DESCRIPTION OF THE DRAWINGS

One or more embodiments of the invention, as well as additional features and its advantages will be better understood with reference to the following detailed description, given purely by way of a non-restrictive indication and without limitation, to be read in conjunction with the attached figures (wherein corresponding elements are denoted with equal or similar references and their explanation is not repeated for the sake of brevity). In this respect, it is expressly understood that the figures are not necessarily drawn to scale (with some details that may be exaggerated and/or simplified) and that, unless otherwise specified, they are simply intended to conceptually illustrate the structures and procedures described herein. In particular.

DETAILED DESCRIPTION OF THE PREFERRED EMBODIMENTS

Figure 1:
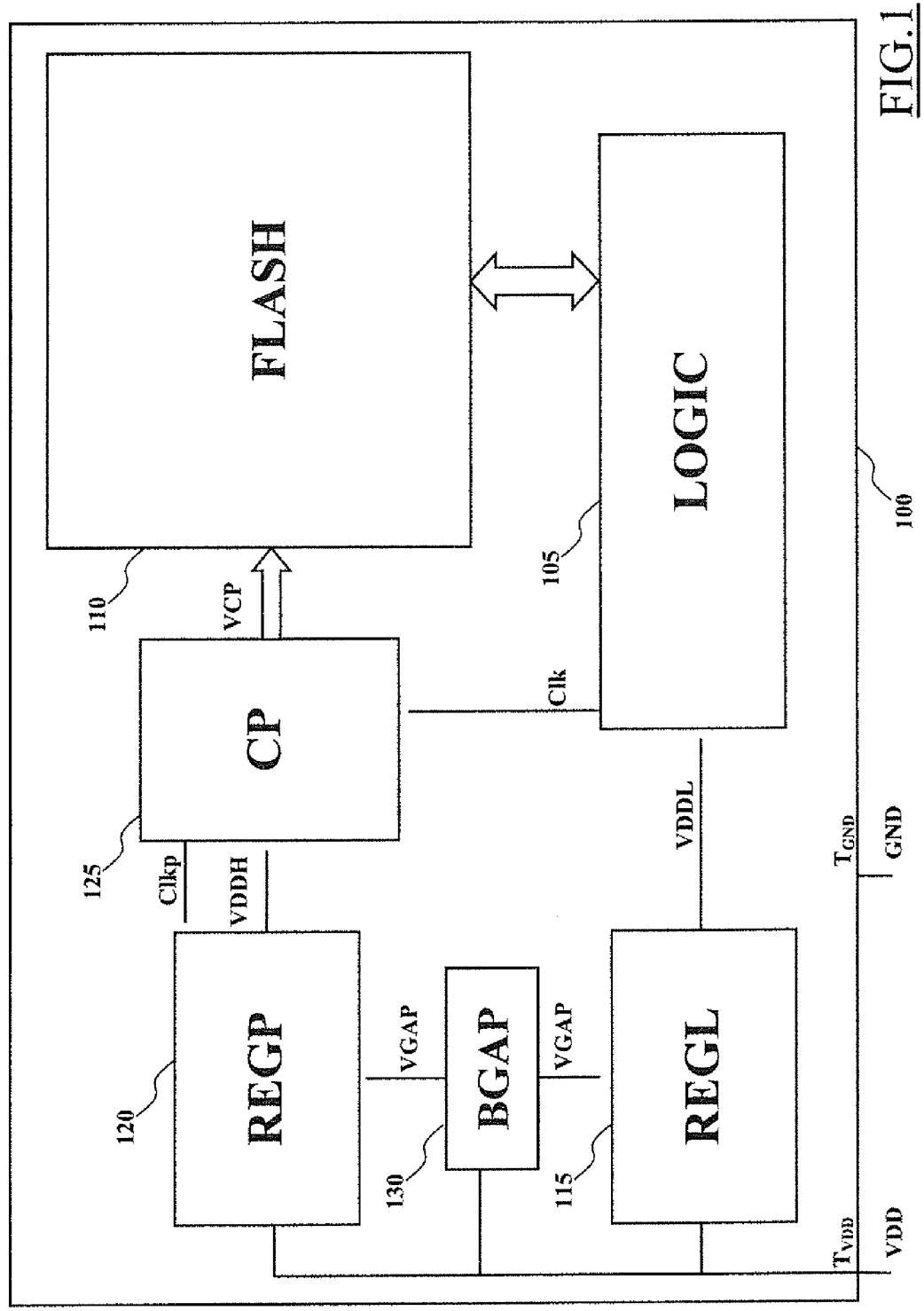
FIG. 1 shows a principle functional block diagram of an electronic apparatus in which a voltage converter according to an embodiment of the present invention may be used.

With reference to FIG. 1, there is shown a principle functional block diagram of an electronic apparatus 100 (e.g., a cell phone) wherein a voltage converter according to an embodiment of the present invention may be used. The electronic apparatus 100 has a reference terminal $T_{GND}$ for receiving a reference (or ground) voltage GND, which is connected to the blocks of the electronic apparatus 100 via corresponding electric lines not shown in the figure for simplicity, and a power supply terminal $T_{VDD}$ for receiving a supply voltage VDD (e.g., included in a range between 2V and 5V with respect to the reference voltage GND).

The electronic apparatus 100 includes a logic circuitry 105 that performs operations for which the electronic apparatus 100 is designed. The logic circuitry 105 is connected to a non-volatile memory 110, for example, an electrically erasable and programmable memory of flash type, which stores data and/or instructions used to perform the operations of the logic circuitry 105. For its proper operation the non-volatile memory 110 uses a set of operating voltages VCP, each of different magnitude even higher in absolute value than the supply voltage VDD (e.g., included in a range between −10V and +10V). On the contrary, for its proper operation the logic circuitry 105 uses a regulated voltage VDDL usually lower than the supply voltage VDD (e.g., comprised between 1-1.2 V).

In the electronic apparatus 100 according to an embodiment of the present invention, a first voltage regulator 115 for providing the regulated voltage VDDL from the supply voltage VDD is implemented. Furthermore, a second voltage regulator 120, which provides another regulated voltage VDDH from the supply voltage VDD, is implemented. A voltage multiplier, for example, a charge pump 125, then generates the operating voltages VCP from such regulated voltage VDDH.

A reference circuit 130 (e.g., of bandgap type) provides a comparison voltage VGAP to the voltage regulators 115 and 120. The comparison voltage VGAP is substantially constant regardless of the operating conditions of the electronic apparatus 100 (i.e., independent from operating parameters such as the temperature or the duration of the operating period). Moreover, the logic circuitry 105 provides a (global) clock signal Clk to the charge pump 125, which internally generates a (pump) clock signal Clkp and its negated signal Clkp (not shown in the figure), which are used to time the succession of internal operations thereof. The clock signal Clkp is also returned to the regulator 120 for controlling its operation (as described below).

In an embodiment according to an embodiment of the invention, the regulated voltage VDDH is higher than the regulated voltage VDDL (e.g., comprised between 1.5V and 1.8V).

The regulated voltage VDDH provided by the voltage regulator 120 to the charge pump 125 allows a more compact implementation thereof (with respect to the case where the charge pump 125 receives the regulated voltage VDDL of lower value). By contrast, the second voltage regulator 120 uses small additional area and electric power consumption. Ultimately, in an embodiment of the present invention the voltage regulator 120 and the charge pump 125 form a voltage converter, capable of efficiently providing the desired set of operating voltages VCP from the supply voltage VDD, with reduced size and without a substantial increase of the electric power absorbed by the electronic apparatus 100.

Figure 2:
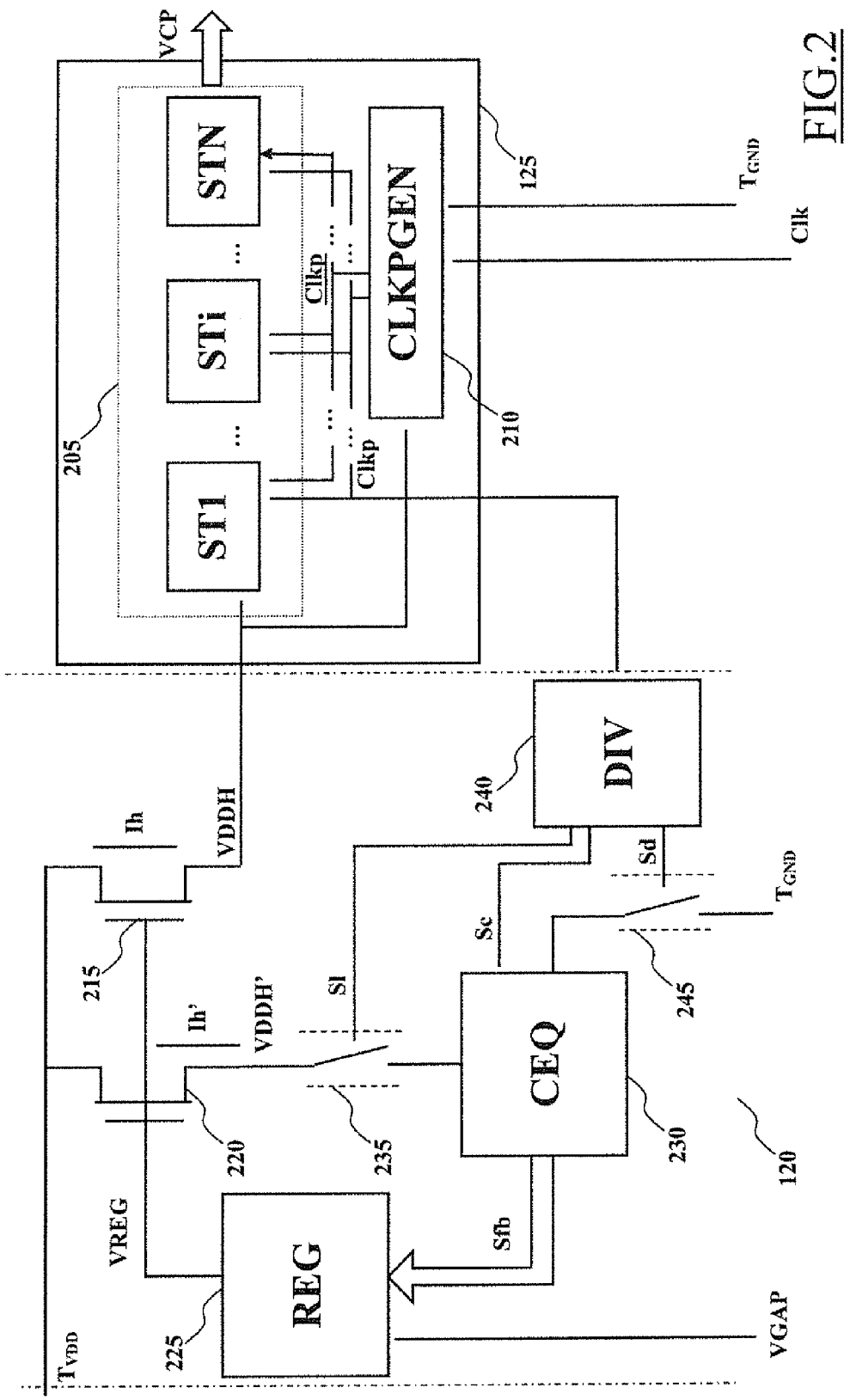
FIG. 2 shows a principle functional block diagram of a voltage converter according to an embodiment of the present invention.

Turning now to FIG. 2, a principle functional block diagram of the voltage regulator 120 and of the charge pump 125 that together form a voltage converter according to an embodiment of the present invention is shown.

The charge pump 125 includes a sequence 205 of N capacitive pumping stages STi (with i=1, . . . N), each controlled by the clock signal Clkp and by its negated signal Clkp. The charge pump 125 also includes a logic block 210, which receives the clock signal Clk (from the logic circuitry, not shown in the figure), the regulated voltage VDDH (from the voltage regulator 120) and the reference voltage GND (from the reference terminal $T_{GND}$). The logic block 210 generates the clock signal Clkp and its negated signal Clkp oscillating between the regulated voltage VDDH and the reference voltage GND with a frequency dependent on that of the clock signal Clk.

During operation, the charge pump 125 exhibits an equivalent input capacity Ceq, which is seen from the voltage regulator 120 at a first conduction, or source, terminal of a power transistor 215 of NMOS type (connected thereto for providing the regulated voltage VDDH). A second conduction, or drain, terminal of the power transistor 215 is connected to a drain terminal of a regulation transistor 220 also of NMOS type. The drain terminals of both the transistors 215 and 220 are connected to the power supply terminal $T_{VDD}$ (for receiving the supply voltage VDD). A control, or gate, terminal of the power transistor 215 and a gate terminal of the regulation transistor 220 are both connected to an output terminal of a regulation block 225 so as to be equally controlled by a corresponding regulation voltage VREG. A source terminal of the regulation transistor 220 is selectively connectable to an input terminal of a simulation block 230 by a switching block 235 (e.g., a switch implemented using an NMOS transistor).

A loop block 240 receives the clock signal Clkp, on the basis of which it generates a discharge signal Sd, a loop signal Sl, and a sampling signal Sc, which are supplied to a discharge block 245, to the switching block 235, and to the simulation block 230, respectively. The discharge element 245 discharges the simulation block 230 to the reference voltage GND when the discharge signal Sd is asserted. The switching block 235 connects the regulation transistor 220 to the simulation block 230 when the switching signal Sl is asserted (in mutual exclusion with the switching signal Sd), in such a way to charge the simulation block 230 to the supply voltage VDD. The simulation block 230 has a simulated capacity Csim proportional to the above-mentioned equivalent capacity Ceq, so that its charge will have a trend corresponding to that of the capacitive stages STi of the charge pump 125.

The simulation block 230 provides a set of (one or more) feedback signals Sfb (depending on its charge) to the regulation block 225 when the sampling signal Sc is asserted. The regulation block 225, based on the feedback signals Sfb and the comparison voltage VGAP, generates the regulation voltage VREG that controls the gate terminal of the transistors 215 and 220 so as to provide the desired regulated voltage VDDH to the charge pump 125.

In other words, the switching block 235, the simulation block 230, the discharge block 245 and the loop block 240 form a feedback system with the task of feedback-controlling the power transistor 215. Indeed, the regulation transistor 220, the simulation block 230, and the regulation block 225 form a feedback loop when the switching block 235 is closed. Such a feedback loop generates the regulation voltage VREG based on a simulation of a trend of the current absorbed by the equivalent capacity Ceq of the charge pump 125. In this way, the voltage converter 120,125 may deal with the time discontinuity with which the electronic systems connected to the charge pump 125 absorb current therefrom (and in particular, the corresponding absorption peaks). This allows the avoiding (or at least substantially reducing) of corresponding drops of the regulated voltage VDDH, with a positive effect on the performance of such electronic systems.

This does not involve any substantial increase in the electric power consumption, and it is obtained with a particularly compact structure. In order to properly define the equivalent capacity Ceq the architecture and the operation of two types of charge pump types will now be described with the support of FIG. 3 and FIG. 4.

Figure 3:
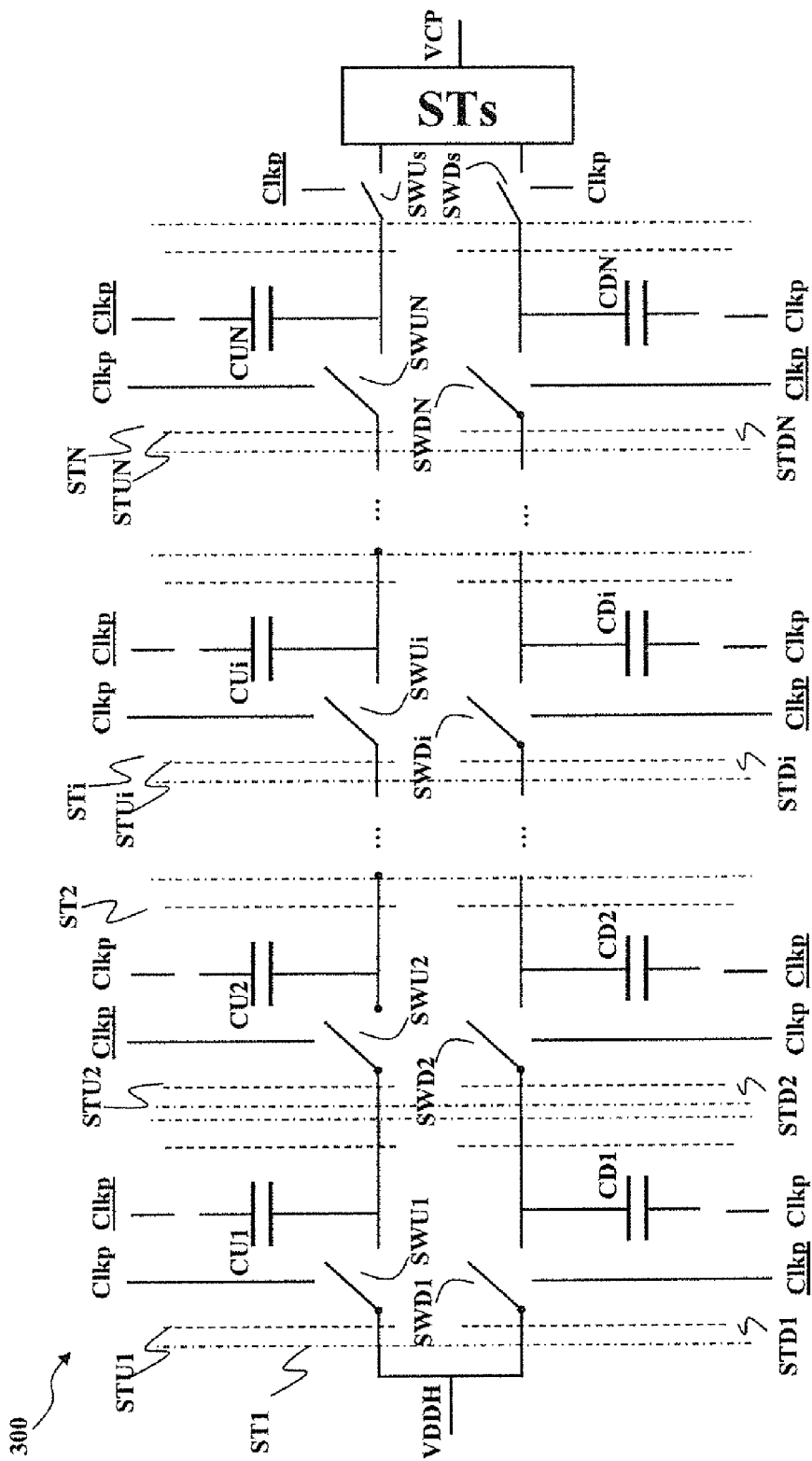
FIG. 3 shows a principle circuit diagram of a dual-branch charge pump of the voltage converter of the present invention.

The FIG. 3 shows a principle circuit diagram of a dual-branch charge pump 300 of the voltage converter. In this case, each pumping stage STi includes an upper sub-stage STUi and a lower sub-stage STDi. Each sub-stage STUi,STDi includes a switch SWUi,SWDi, connected between its input terminal and its output terminal, and a pumping capacitor CUi,CDi connected to the output terminal of the sub-stage STUi,STDi via its first terminal. The input terminal of each sub-stage STUi,STDi is connected to the output terminal of a previous sub-stage STUi−1,STDi−1—with the exception of a first sub-stage STU1,STD1 in which the input terminal receives the regulated voltage VDDH and of a final sub-stage STUN,STDN in which the output terminal is connected to a stabilization stage STs through a corresponding switch SWUs,SWDs. In addition, a control terminal of each switch SWUi,SWDi and a second terminal of the capacitor CUi, CDi alternately receive the clock signal Clkp or its negated signal $\overline{Clkp}$. In particular, each switch SWUi receives the clock signal Clkp or the negated clock signal $\overline{Clkp}$, depending on whether the capacitive stage STi in which it is included occupies an odd or an even position in the sequence, while the corresponding switch SWDi receives the negated clock signal $\overline{Clkp}$ or the clock signal Clkp depending on whether the capacitive stage STi in which it is included occupies an odd or even position in the sequence. Conversely, the capacitor CUi receives the negated clock signal $\overline{Clkp}$ or the clock signal Clkp depending on whether the capacitive stage STi in which it is included occupies an odd or even position in the sequence, while the capacitor CIA receives the clock signal Clkp or the negated clock signal $\overline{Clkp}$ depending on whether the capacitive stage STi in which it is included occupies an odd or even position in the sequence. In addition, the switch SWUs receives the clock signal Clkp or the negated clock signal $\overline{Clkp}$ depending on whether the last capacitive stage STN is in even or odd position, respectively. Conversely, the switch SWDs receives the negated clock signal $\overline{Clkp}$ or the clock signal Clkp depending on whether the last capacitive stage STN is in even or odd position, respectively.

During operation, each switch SWUi and SWDi is opened or closed when the corresponding clock signal Clkp,$\overline{Clkp}$ is at the regulated voltage VDDH or at the reference voltage GND, respectively. In this way, during each cycle of the clock signal Clkp,$\overline{Clkp}$ each capacitor CUi and CDi is firstly charged by the capacitor CUi−1 and CDi−1 of the previous capacitive stage (with the exception of the capacitors CU1 and CD1 that are charged by the regulated voltage VDDH), and then charge the capacitor CUi+1 and CDi+1 of the next capacitive stage (with the exception of the capacitors CUN and CDN alternately providing electric charge to the stabilization stage STs). Therefore, it is possible to define the equivalent capacity Ceq of the charge pump 300 as seen through the set of the terminals that provide the regulated voltage VDDH and the reference voltage GND (i.e., essentially the input terminal of the charge pump 300 and the second terminals of the capacitors CUi and CDi) as follows:

$$Ceq = 2C + (N-1)\frac{C}{2} = C\frac{(N+3)}{2},$$

where C indicates the capacity of each capacitor CUi and CDi.

Figure 4:
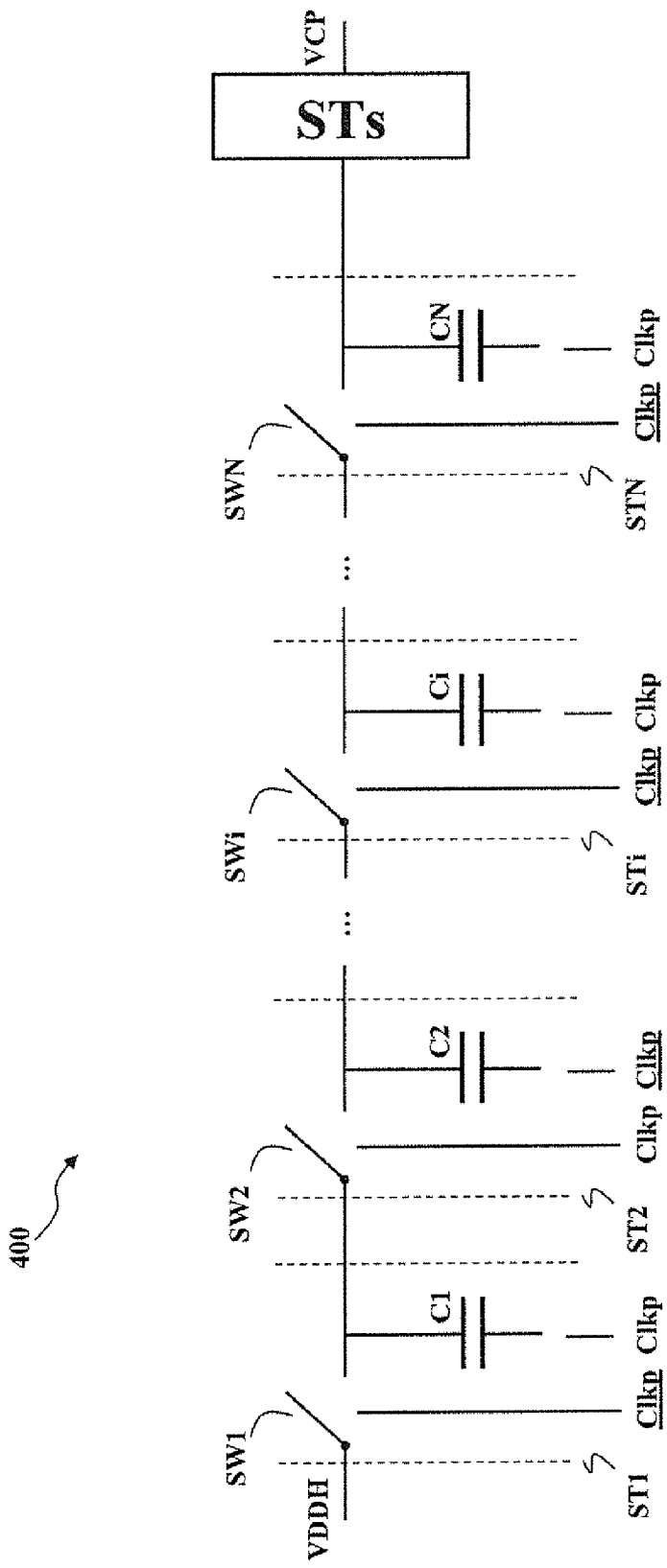
FIG. 4 shows a principle circuit diagram of a single-branch charge pump of the voltage converter of the present invention.

In FIG. 4 a principle circuit diagram of a single-branch charge pump 400 of the voltage converter (e.g., used in electronic apparatuses with low power consumption) is shown. In particular, let consider an even number N of capacitive stages STi, since in this case the equivalent capacity Ceq is dependent on the value of the clock signal Clkp,$\overline{Clkp}$. In this case, each capacitive stage STi includes a switch SWi, connected between its input terminal and its output terminal, and a pumping capacitor Ci, connected to the output terminal of the capacitive stage STUi by its first terminal. The input terminal of each capacitive stage STi is connected to the output terminal of a previous capacitive stage STi−1—with the exception of the first capacitive stage ST1 in which the input terminal receives the regulated voltage VDDH, and of a final capacitive stage STN in which the output terminal is connected to a stabilization stage STs. In addition, a control terminal of each switch SWi and a second terminal of each capacitor Ci alternately receive the clock signal Clkp or the negated clock signal $\overline{Clkp}$. In particular, each switch SWi receives the clock signal Clkp or the negated clock signal $\overline{Clkp}$ depending on whether the capacitive stage STi in which it is included occupies an odd or even position in the sequence. Conversely, the capacitor Ci receives the negated clock signal $\overline{Clkp}$ or the clock signal Clkp depending on whether the capacitive stage STi in which it is included occupies an odd or even position in the sequence.

During each cycle of the clock signal Clkp,$\overline{Clkp}$ each capacitor Ci is firstly charged by the capacitor Ci−1 of the previous capacitive stage (with the exception of the capacitor C1 which is charged by the regulated voltage VDDH), and then charges the capacitor Ci+1 of the next capacitive stage (with the exception of the capacitor CN that provides electric charge to the stabilization stage STs). Consequently, the equivalent capacity Ceq of the charge pump 400 as seen through the set of terminals that provide the regulated voltage VDDH and the reference voltage GND (i.e., essentially the input terminal of the charge pump 400, and the second terminals of the capacitors Ci) depends on the value of the clock signal Clkp,$\overline{Clkp}$ and may be defined as follows:

$$Ceq = \begin{cases} 2C + \dfrac{(N-2)}{2}C = C\dfrac{N}{2} + 1 & Clkp = VDDH \\ N\dfrac{C}{2} & Clkp = GND \end{cases},$$

where C indicates the capacity of each capacitor Ci.

Figure 5:
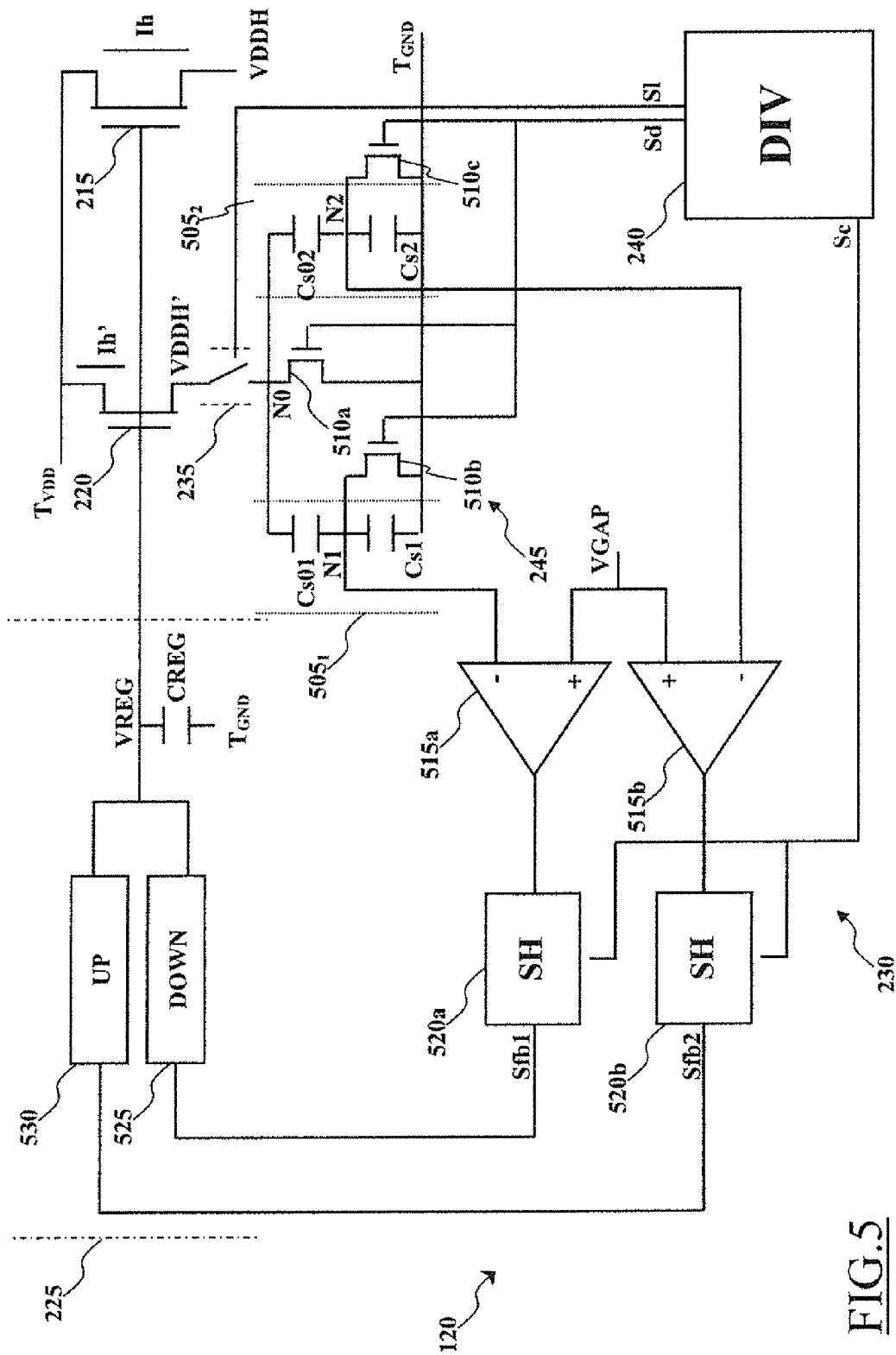
FIG. 5 shows a principle functional block diagram of a voltage regulator of the voltage converter according to an embodiment of the present invention adapted to drive the dual-branch charge pump.

Turning now to FIG.5, a principle functional block diagram of the voltage regulator 120 of the voltage converter according to an embodiment of the present invention adapted to drive the above-described dual-branch charge pump is shown.

As can be seen from the figure, the simulation block 230 includes a first capacitive branch $505_1$ and a second capacitive branch $505_2$, which are connected in parallel between a common circuit node N0 and connected to the source terminal of the regulation transistor 220 through the switching block 235 and the reference terminal $T_{GND}$ by the discharge block 245. In more detail, the capacitive branches $505_1$ and $505_2$ are sized so that their parallel seen at the source terminal of the regulator transistor 220 has the simulated capacity Csim, proportional to the equivalent capacity Ceq seen at the source terminal of the power transistor 215. The first capacitive branch $505_1$ includes a front capacitor Cs01 (with a capacity Cs0) and a first capacitor Cs1 (with a capacity Cs1) connected in series by a first intermediate circuit node N1. Similarly, the second capacitive branch $505_2$ includes a further front capacitor Cs02 (with the same capacity Cs0) and a second capacitor Cs2 (with a capacity Cs2 lower than the capacity Cs1) connected in series by a second intermediate node N2.

The circuit node N1 is connected to an inverting terminal (−) of a first comparator 515a, and the circuit node N2 is connected to the inverting terminal (−) of a second comparator 515b. A non-inverting terminal (+) of both the comparators 515a and 515b receives the comparison voltage VGAP (from the reference circuit, not shown in the figure). An output terminal of the comparator 515a is connected to a first sampler 520a that is also input the sampling signal Sc. In a similar way, an output terminal of the comparator 515b is connected to a second sampler 520b that is also input the sampling signal Sc. The sampler 520a generates the feedback signal Sfb1, while the sampler 520b generates the feedback signal Sfb2.

The discharge block 245 includes a first, a second and a third discharge switch 510a, 510b and 510c (e.g., MOS transistors), which have a first conduction terminal (e.g., a drain terminal) connected to the circuit nodes N0, N1 and N2, respectively. The discharge switches 510a, 510b and 510c have a second conduction terminal (e.g., a source terminal) connected to the reference terminal $T_{GND}$, while they receive the discharge signal Sd at a control terminal.

The regulation block 225 includes a decreasing charge pump 525 that is controlled by the feedback signal Sfb1, and an increasing charge pump 530 that is controlled by the feedback signal Sfb2. Output terminals of the charge pumps 525 and 530 are connected to each other, and to a first terminal of a regulation capacitor CREG, whose second terminal is connected to the reference terminal $T_{GND}$. In particular, the decreasing charge pump 525 is configured for discharging the capacitor CREG, while the increasing charge pump 530 is configured for charging the capacitor CREG. The first terminal of the capacitor CREG provides the regulation voltage VREG.

The operation of the voltage regulator 120 is the following. In an initialisation phase, the loop block 240 de-asserts the loop signal Sl and asserts the discharge signal Sd, so as to open the switching block 235 and to close the discharge switches 510a, 510b and 510c, respectively. In this configuration, the capacitors Cs01, Cs02, Cs1 and Cs2 are discharged to the reference voltage GND (so that a voltage VDDH' at the circuit node N0, a voltage V1 at the circuit node N1 and a voltage V2 at the circuit node N2 are null).

In a subsequent feedback phase, the loop block 240 asserts the loop signal Sl and de-asserts the discharge signal Sd, so as to close the switching block 235 and to open the discharge switches 510a, 510b and 510c, respectively. In this configuration, both the capacitive branches $505_1$ and $505_2$ are charged by a current Ih' that crosses the regulation transistor 220, and is proportional to the current Ih that crosses the power transistor 215—since both the transistors 215 and 220 receive the same regulation voltage VREG at their gate terminal. Consequently, the voltage VDDH' at the node N0 increases, and at the same time, the voltage V1 reaches the value:

$$V1 = VDDH' \frac{Cs0}{Cs1 + Cs0},$$

and the voltage V2 reaches the value:

$$V2 = VDDH' \frac{Cs0}{Cs2 + Cs0}$$

(always higher than the voltage V1, since Cs2<Cs1).

The comparator 515a verifies whether the voltage V1 is higher than the comparison voltage VGAP. The comparator 515a outputs a low voltage value in the affirmative case (i.e., V1>VGAP), while it outputs a high voltage value in the negative case (i.e., V1<VGAP). The sampler 520a acquires the value output by the comparator 515a when the sampling signal Sc is asserted and inputs the corresponding feedback signal Sfb1 to the decreasing charge pump 525. Differently, the comparator 515b verifies whether the intermediate voltage V2 is lower than the comparison voltage VGAP. The comparator 515a outputs the high voltage value in the affirmative case (i.e., V<VGAP), while it outputs the low voltage value in the negative case (i.e., V2>VGAP). The sampler 520b acquires the value output by the comparator 515a when the sampling signal Sc is asserted and inputs the corresponding feedback signal Sfb2 to the increasing charge pump 530. The decreasing charge pump 525 discharges the regulation capacitor CREG when the feedback signal Sfb1 is asserted. Similarly, the increasing charge pump 530 charges the regulation capacitor CREG when the feedback signal Sfb2 is asserted.

In this way, the regulation voltage VREG is dynamically set for ensuring that the capacitive branches $505_1$ and $505_2$ are charged when the intermediate voltage V1 is lower than the comparison voltage VGAP. At the same time, the regulation voltage VREG is dynamically set for ensuring that the capacitive branches $505_1$ and $505_2$ are discharged when the intermediate voltage V2 is higher than the comparison voltage VGAP.

In this way, the voltages V1 and V2 will tend towards the value of the voltage VGAP (without ever reaching it exactly). In the particular above-described embodiment, such a result is achieved by using a single comparison voltage VGAP (thanks to the different capacities of the capacitive branches $505_1$ and $505_2$).

It is possible to size the capacitors Cs01, Cs02, Cs1e Cs2 in such a way that the charge of the capacitive branches $505_1$ and $505_2$—performed by the current Ih' of the regulation transistor 220, determined by the regulation voltage VREG—brings the voltage VDDH' to a predetermined value, corresponding to the desired voltage VDDH. This regulation of the charge of the capacitive branches $505_1$ and $505_2$—whose parallel is the simulated capacity Csim—allows regulating the charge of the equivalent capacity Ceq of the charge pump (not shown in the figure) performed by the current Ih of the power transistor 215. Indeed, since both the transistors 215 and 220 are controlled by the same regulation voltage VREG, the currents Ih and Ih' are proportional to each other—according to a ratio of the effective sizes of the two transistors 215 and 220. Therefore, the charging of the simulated capacity Csim and the charging of the equivalent capacity Ceq (proportional to each other) will have a corresponding trend over time. In particular, by setting a ratio between the currents Ih/Ih' (sizing the transistors 215 and 220 accordingly) and a ratio between the capacities Ceq/Csim substantially equal to a same proportionality factor K, the trend over time of the charging of the capacities Csim and Ceq will be substantially identical.

In this way, moreover, the size of the regulation transistor 215 and of the capacitors Cs01, Cs02, Cs1 and Cs2 are scaled by the same proportionality factor K. This implies that the electric power absorbed by the feedback loop formed by the regulation transistor 220, the capacity branches $505_1$ and $505_2$, the comparators 515a and 515b, the samplers 520a and 520b, the charge pumps 525 and 530, and the regulation capacitor CREG is reduced by the same proportionality factor K compared to an electric power supplied by the power transistor 215 (to the charge pump). These embodiments therefore allow obtaining the desired result with a limited consumption of electric power.

Figure 6:
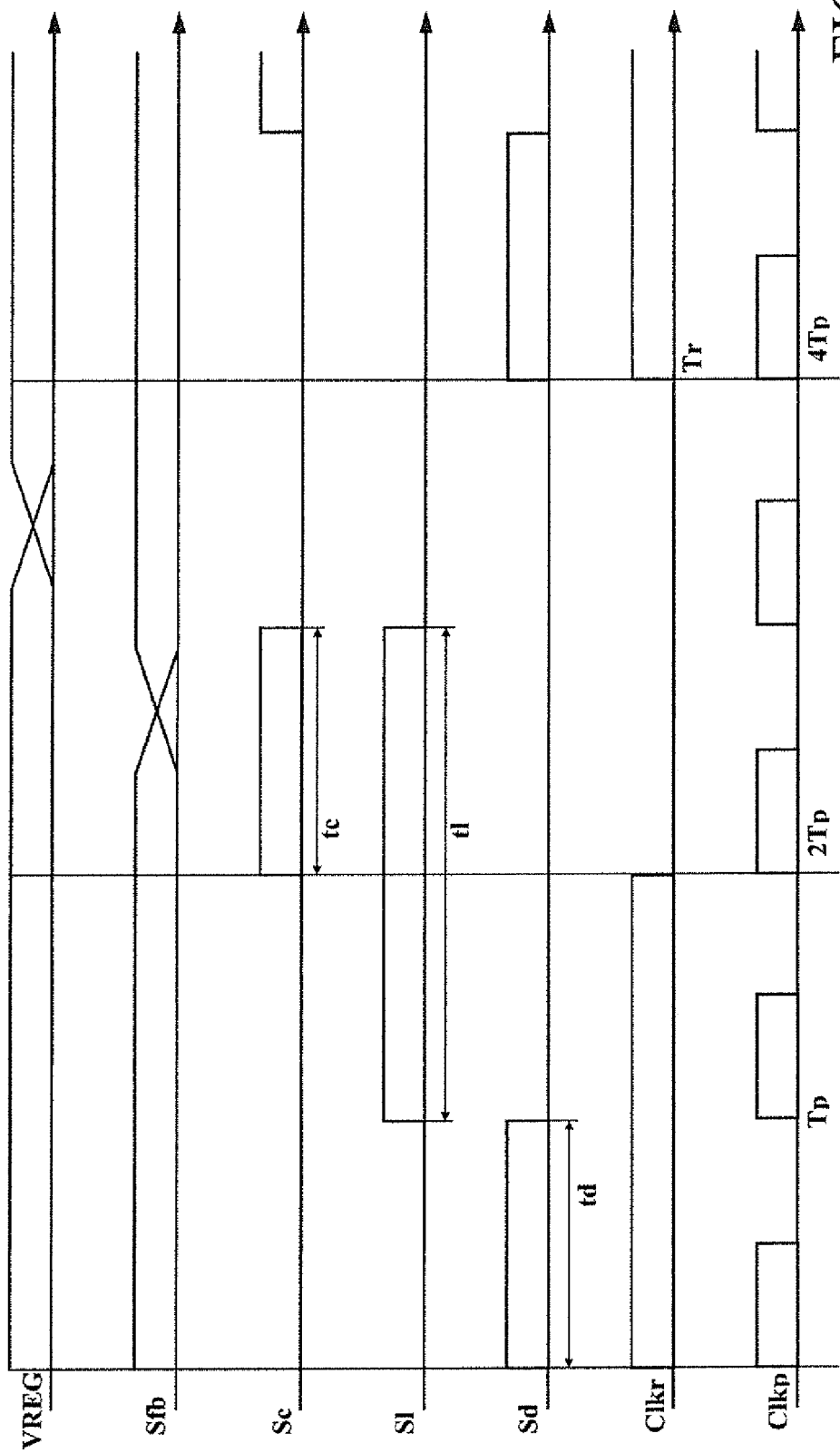
FIG. 6 shows a diagram of the trends versus time of operating signals of the voltage converter for the dual-branch charge pump according to an embodiment of the invention.

In FIG. 6 a diagram of the trends versus time of operating signals of the voltage converter for the dual-branch charge pump according to an embodiment of the invention is shown. Initially, a period Tp of the clock signal Clkp is divided by a division factor D (e.g., D=4), thereby generating a regulation clock signal Clkr with a period Tr=DTp (i.e., Tr=4Tp in the considered example). During each period Tr, the discharge signal Sd is asserted upon the switching from the low value to the high value of the regulation clock signal Clkr, and it is maintained asserted for an interval of time td sufficient to fully discharge the equivalent capacity Csim (e.g., equal to Tp). As soon as the discharge signal Sd is de-asserted, the loop signal Sl is asserted for a time interval tl for charging the capacitor Csim and generating the feedback signals Sfb1 and Sfb2 (e.g., equal to 2Tp). After a predetermined time interval from the assertion of the loop signal Sl (e.g., equal to Tp), the sampling signal Sc as well is asserted while the loop signal Sl remains asserted (for a time interval tc—equal to Tp in this example). Subsequently, the voltage VREG is modified according to the feedback signals Sfb1 and Sfb2 generated in the preceding time interval tc.

In this case, the regulation frequency of the charge pump (defined by the period Tr) depends on its operating frequency (defined by the period Tp). The converter is thus able to dynamically cope with changes in electric charge request. For example, let consider the exemplary case of writing of data into the non-volatile memory. In this condition, the charge pump has to provide a high electric charge to the non-volatile memory so that it may complete the writing. Therefore, the period Tp is reduced to transfer charge faster. The voltage regulator is able to dynamically meet such increase in the transfer of electric charge since also the period Tr is reduced proportionally to the reduction of the period Tp. Consequently, the regulation voltage VREG will be modified with a higher frequency.

The division factor D is empirically chosen as a compromise between the conflicting requirements of reduction of electric power consumption of the feedback loop previously described (high division factor D) and regulation response speed (low division factor D).

Figure 7:
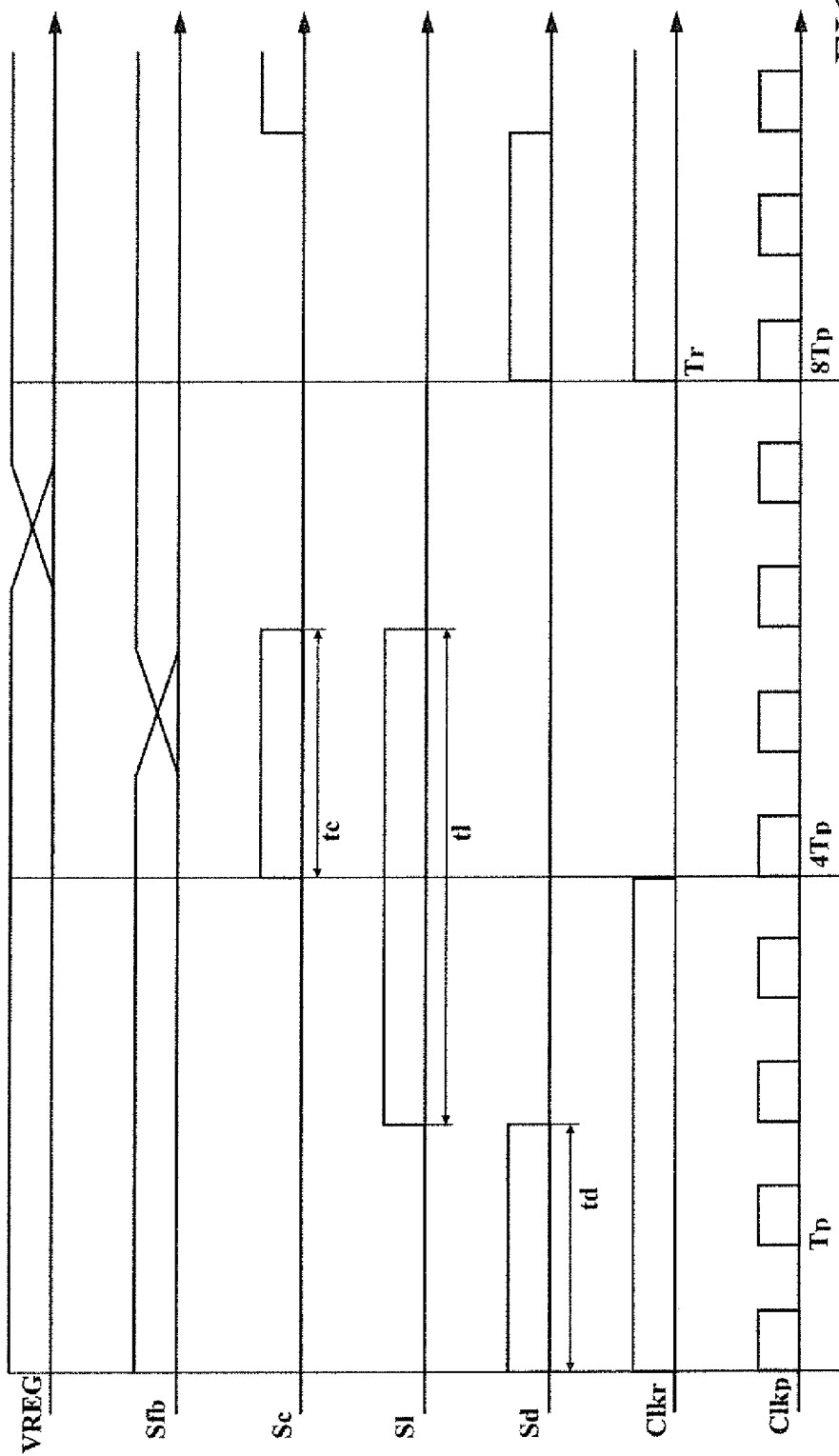
FIG. 7 shows a diagram of the trends versus time of operating signals of the voltage converter for the dual-branch charge pump, during a standby condition thereof, according to an embodiment of the invention.

Considering FIG. 7, a diagram of the trends versus time of operating signals of the voltage converter for the dual-branch charge pump, during a standby condition thereof, according to an embodiment of the invention is shown. In the standby condition, the electric power used for the operation of the charge pump is significantly reduced (as it does not have to provide virtually any current). In this condition, the voltage regulator has to supply a lower charge to the charge pump in order to maintain its output terminal at the desired voltage. As a result, the regulation period Tr may be extended by increasing the division factor D (for example, by doubling it) without suffering performance degradation in the voltage converter, but reducing the power consumption thereof. In FIG. 7, it is possible to see how the signals Clkr, Sd, Sl, Sc follow a pattern substantially corresponding to the one described with reference to the FIG. 6, but with a duration extended by the increased division factor D.

Figure 8:
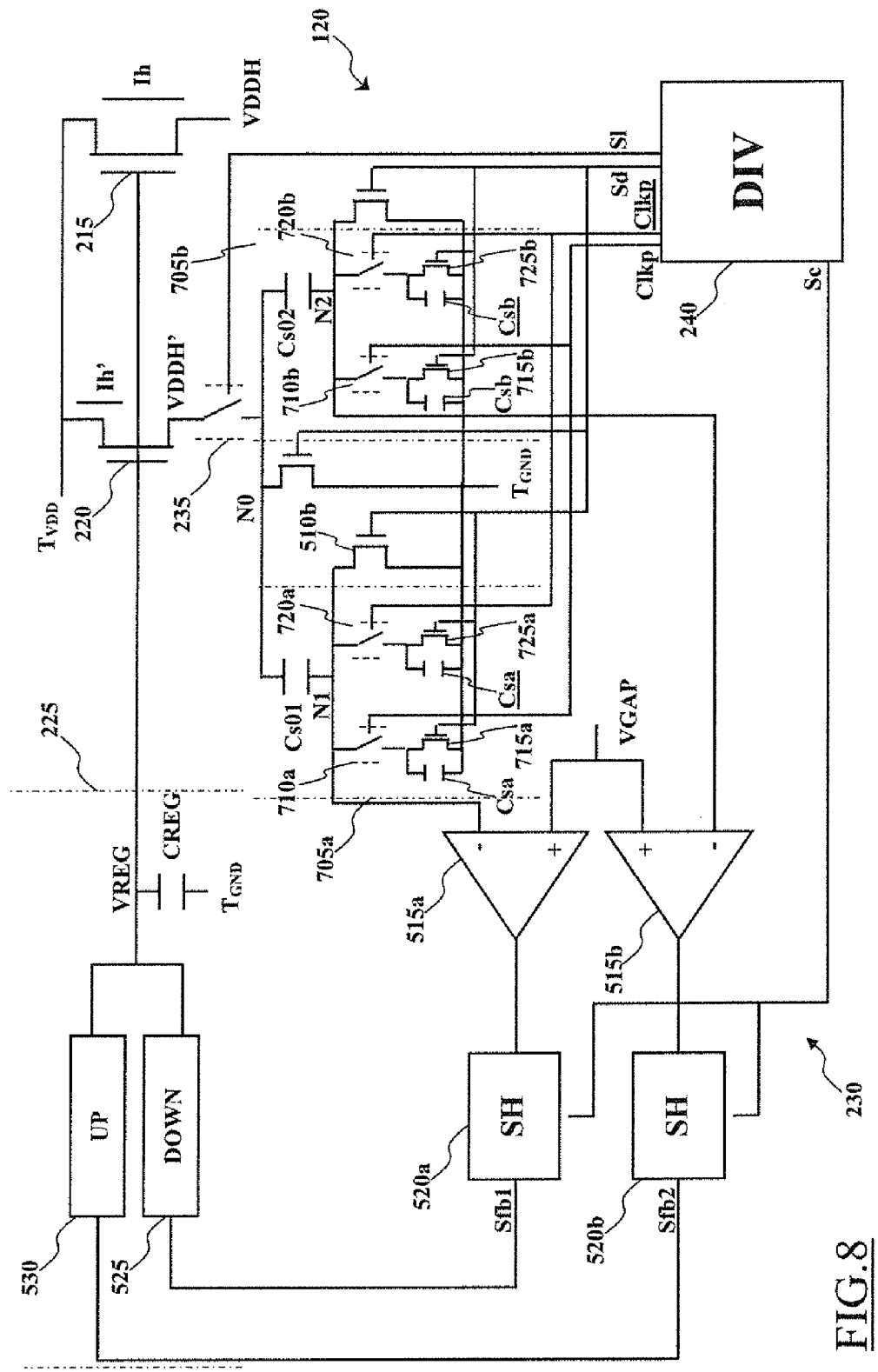
FIG. 8 shows a principle functional block diagram of a voltage regulator of the voltage converter according to an embodiment of the present invention adapted to drive the single-branch charge pump.

Turning now to FIG. 8, a principle functional block diagram of a voltage regulator of the voltage converter according to an embodiment of the present invention adapted to drive the single-branch charge pump is shown. The voltage converter differs from the voltage converter described with respect to FIG. 5 as follows. The capacitive branches (indicated by the references 705a and 705b) are formed so that the simulated capacity Csim varies with the pump clock signal Clkp as described above.

For this purpose, the capacitive branch 705a includes the same front capacitor Cs01 (with the same capacity Cs0) connected to the first intermediate circuit node N1. At the intermediate circuit node N1, there are selectively connectable a first capacitor Csa (with a capacity Csa) and a first discharge switch 715a via a first switch 710a, or a further first capacitor Csa (with a capacity Csa different from Csa) and a further first discharge switch 725a via a further first switch 720a. The switch 710a is controlled by the clock signal Clkp and the switch 720a is controlled by its negated signal Clkp (both provided by the loop block 240).

Similarly, the second branch 705b includes the same front capacitor Cs02 (with the same capacity Cs0) connected to a second intermediate circuit node N2. At the intermediate circuit node N2, there are selectively connectable a second capacitor Csb (with a capacity Csb lower than the capacity Csa) and a second discharge switch 715b via a second switch 710b, or a further second capacitor Csb (with a capacity Csb lower than the capacity Csa) and a further second discharge switch 725b via a further second switch 720b. The switch 710b is controlled by the clock signal Clkp, and the switch 720b is controlled by its negated signal Clkp.

The voltage regulator of FIG. 8 has a capacity Csim whose value varies according to the clock signal Clkp,Clkp in such a way to correspond to the value of the capacity Ceq of the charge pump (not shown in the figure) during its operation. The voltage regulator operates in a similar manner to the voltage regulator of FIG. 5 previously described.

Naturally, in order to satisfy local and specific requirements, a person skilled in the art may apply to the approach described above many logical and/or physical modifications and alterations. More specifically, although this approach has been described with a certain degree of particularity with reference to one or more embodiments thereof, it should be understood that various omissions, substitutions and changes in the form and details as well as other embodiments are possible.

Particularly, different embodiments of the invention may even be practiced without the specific details (such as the numerical examples) set forth in the preceding description to provide a more thorough understanding thereof. Conversely, well-known features may have been omitted or simplified in order not to obscure the description with unnecessary particulars. Moreover, it is expressly intended that specific elements and/or method steps described in connection with any embodiment of the disclosed approach may be incorporated in any other embodiment as a matter of general design choice.

For example, similar considerations apply if the voltage converter device has a different architecture or includes equivalent components, or it has different operating characteristics. In any case, any component may be separated into several parts, or two or more components may be combined into a single element. Moreover, each component may be replicated for supporting the implementation of the corresponding operations in parallel. It also has to be noted that (unless stated otherwise) any interaction between different components generally need not being continuous, and may be both direct and indirect through one or more intermediaries.

Nothing prevents the voltage converter from including any other voltage multiplier (e.g., a charge pump with a number of parallel branches higher than two). Furthermore, the power and control transistors may have any other structure (e.g., BJT, cascode, and the like). The simulated capacity may be differently set with respect to the equivalent capacity of the charge pump.

Moreover, such a simulated capacity may be varied in other ways for adapting to the corresponding changes in the equivalent capacity of the charge pump (e.g., through variable-capacity capacitors).

The feedback signals as well as the capacitive branches, the comparators and the samplers included in the feedback system may be in a number different from two. The control signal may be generated out of phase with respect to the pump clock signal. In any case, it is possible to detect a single intermediate voltage by comparing it with two different comparison voltages (to control the regulation voltage accordingly).

Nothing prohibits the discharge element from including a different number of switches or the nodes from being discharged to a different voltage than the reference one. Nothing prevents imposing a different period of the regulation signal (also equal to or lower than the period of the pump clock signal). The period of the regulation signal may remain unchanged during the standby condition of the charge pump.

The proposed approach may be applied to any other voltage converter device (also in a standard structure with a single voltage regulator). Vice-versa, the structure with two voltage regulators (in order to have a higher regulated voltage for the voltage multiplier) lends itself to be implemented with a standard structure of the voltage regulators.

It should be readily apparent that the proposed approach might be part of the design of an integrated device. The design may also be created in a programming language. In addition, if the designer does not manufacture the integrated devices or the masks, the design may be transmitted through physical means to others. Anyway, the resulting integrated device may be distributed by its manufacturer in the form of a raw wafer, as a naked chip, or in packages. Moreover, the proposed structure may be integrated with other circuits in the same chip, or it may be mounted in intermediate products (such as motherboards) and coupled with one or more other chips (such as a processor). In any case, the integrated device is adapted to be used in complex systems (such as automotive applications or microcontrollers).

Similar considerations apply if the same approach is implemented by an equivalent method (by using similar steps with the same functions of more steps or portions thereof, removing some steps being not essential, or adding further optional steps). Moreover, the steps may be performed in different order, in parallel or overlapped (at least in part).

That which is claimed is:

1. A voltage converter device comprising:
    a voltage regulator having a supply terminal configured to receive a supply voltage and an output terminal configured to provide a regulated voltage;
    a voltage multiplier configured to receive the regulated voltage and configured to provide a boosted voltage higher in absolute value than the regulated voltage, the voltage multiplier comprising circuitry configured to provide a clock signal periodically switching between the regulated voltage and a reference voltage, and a sequence of capacitive stages configured to alternately accumulate and transfer electric charge according to the clock signal for generating the boosted voltage from the regulated voltage;
    the voltage regulator including a power transistor and a regulation transistor each having a first conduction terminal, a second conduction terminal, and a control terminal, the first conduction terminals of the power transistor and of the regulation transistor being coupled to the supply terminal, the second conduction terminal of the power transistor being coupled to the output terminal, the voltage regulator also including feedback circuitry coupled to the second conduction terminal of the regulation transistor and configured to provide at least one feedback signal and regulation circuitry configured to control the control terminals of the power transistor and the regulation transistor based upon the at least one feedback signal;
    the feedback circuitry comprising capacitive circuitry having a capacitance corresponding to an equivalent capacitance of the voltage multiplier in operation as seen at the output terminal, discharge circuitry configured to discharge the capacitive circuitry to the reference voltage, switching circuitry configured to charge the capacitive circuitry by coupling the capacitive circuitry to the second terminal of the regulation transistor, control circuitry configured to enable the discharge circuitry and the switching circuitry in mutual exclusion according to the clock signal, and detection circuitry configured to derive the at least one feedback signal from the capacitive circuitry while the switching circuitry is enabled.

2. The voltage converter device according to claim 1, wherein the voltage multiplier comprises a dual-branch charge pump; and wherein the capacitive circuitry has a capacitance corresponding to the equivalent capacitance of the voltage multiplier.

3. The voltage converter device according to claim 2, wherein the at least one feedback signal includes a first feedback signal and a second feedback signal (Sfb2);
    wherein the regulation circuitry includes circuitry configured to increase or decrease a conductivity of the power transistor and of the regulation transistor when the first feedback signal and the second feedback signal are asserted or de-asserted, respectively; and wherein the capacitive circuitry includes a first capacitive branch and a second capacitive branch having different capacitances and being coupled in parallel by a common node to the second conduction terminal of the regulation transistor through the switching circuitry, each capacitive branch including a pair of capacitors coupled in series by an intermediate node; and wherein the feedback circuitry includes a first comparator and a second comparator for providing the first feedback signal and the second feedback signal, respectively, according to a comparison between an intermediate voltage at the intermediate node of the first capacitive branch and of the second capacitive branch, respectively, and a common comparison voltage.

4. The voltage converter device according to claim 3, wherein the discharge circuitry includes a common switch configured to selectively couple the common node of the first capacitive branch and the second capacitive branch to a reference terminal for receiving the reference voltage, and a first switch and a second switch configured to selectively couple the intermediate node of the first capacitive branch and of the second capacitive branch, respectively, to the reference terminal.

5. The voltage converter device according to claim 1, wherein the voltage multiplier comprises a single-branch charge pump, the equivalent capacitance of the charge pump having a first value and a second value when the clock signal is equal to the regulated voltage and to the reference voltage, respectively; and wherein the feedback circuitry includes circuitry configured to vary the capacitance of the capacitive circuitry between the first value and the second value when the clock signal is equal to the regulated voltage and to the reference voltage, respectively.

6. The voltage converter device according to claim 1, wherein the control circuitry includes circuitry configured to generate a regulation signal in phase with the clock signal, and circuitry configured to enable the discharge circuitry and the switching circuitry in succession during each period of the regulation signal.

7. The voltage converter device according to claim 6, wherein the regulation signal has a period greater than a period of the clock signal.

8. The voltage converter device according to claim 7, wherein the control circuitry includes circuitry configured to increase the period of the regulation signal when the voltage multiplier is in a standby condition.

9. An electronic apparatus comprising:
a voltage converter device comprising
a voltage regulator having a supply terminal configured to receive a supply voltage and an output terminal configured to provide a regulated voltage,
a voltage multiplier configured to receive the regulated voltage and configured to provide a boosted voltage higher in absolute value than the regulated voltage, the voltage multiplier comprising circuitry configured to provide a clock signal periodically switching between the regulated voltage and a reference voltage, and a sequence of capacitive stages configured to alternately accumulate and transfer electric charge according to the clock signal for generating the boosted voltage from the regulated voltage,
the voltage regulator including a power transistor and a regulation transistor each having a first conduction terminal, a second conduction terminal, and a control terminal, the first conduction terminals of the power transistor and of the regulation transistor being coupled to the supply terminal, the second conduction terminal of the power transistor being coupled to the output terminal, the voltage regulator also including feedback circuitry coupled to the second conduction terminal of the regulation transistor and configured to provide at least one feedback signal and regulation circuitry configured to control the control terminals of the power transistor and the regulation transistor based upon the at least one feedback signal,
the feedback circuitry comprising capacitive circuitry having a capacitance corresponding to an equivalent capacitance of the voltage multiplier in operation as seen at the output terminal, discharge circuitry configured to discharge the capacitive circuitry to the reference voltage, switching circuitry configured to charge the capacitive circuitry by coupling the capacitive circuitry to the second terminal of the regulation transistor, control circuitry configured to enable the discharge circuitry and the switching circuitry in mutual exclusion according to the clock signal, and detection circuitry configured to derive the at least one feedback signal from the capacitive circuitry while the switching circuitry is enabled;
a further voltage regulator having a further supply terminal configured to receive the supply voltage, a further output terminal configured to provide a further regulated voltage lower than the regulated voltage, operating circuits powered by the regulated voltage, and further operating circuits powered by the further regulated voltage.

10. The electronic apparatus according to claim 9, wherein the voltage multiplier comprises a dual-branch charge pump; and wherein the capacitive circuitry has a capacitance corresponding to the equivalent capacitance of the voltage multiplier.

11. The electronic apparatus according to claim 9, wherein the voltage multiplier comprises a single-branch charge pump, the equivalent capacitance of the charge pump having a first value and a second value when the clock signal is equal to the regulated voltage and to the reference voltage, respectively; and wherein the feedback circuitry includes circuitry configured to vary the capacitance of the capacitive circuitry between the first value and the second value when the clock signal is equal to the regulated voltage and to the reference voltage, respectively.

12. A voltage converter device comprising:
a voltage regulator having a supply terminal configured to receive a supply voltage and an output terminal configured to provide a regulated voltage, the voltage regulator including feedback circuitry configured to provide at least one feedback signal;
a voltage multiplier configured to receive the regulated voltage and configured to provide a boosted voltage based upon the regulated voltage;
the feedback circuitry comprising capacitive circuitry having a capacitance corresponding to an equivalent capacitance of the voltage multiplier in operation as seen at the output terminal, discharge circuitry configured to discharge the capacitive circuitry to the reference voltage, switching circuitry configured to charge the capacitive circuitry, control circuitry configured to enable the discharge circuitry and the switching circuitry in mutual exclusion according to the a signal, and detection circuitry configured to derive the at least one feedback signal from the capacitive circuitry while the switching circuitry is enabled.

13. The voltage converter device according to claim 12, wherein the voltage multiplier comprises a dual-branch charge pump; and wherein the capacitive circuitry has a capacitance corresponding to the equivalent capacitance of the voltage multiplier.

14. The voltage converter device according to claim 12, wherein the voltage multiplier comprises a single-branch charge pump, the equivalent capacitance of the charge pump having a first value and a second value when the clock signal is equal to the regulated voltage and to the reference voltage, respectively; and wherein the feedback circuitry includes circuitry configured to vary the capacitance of the capacitive circuitry between the first value and the second value when the clock signal is equal to the regulated voltage and to the reference voltage, respectively.

15. A method for controlling a voltage converter device including a voltage regulator having a supply terminal configured to receive a supply voltage and an output terminal configured to provide a regulated voltage, and a voltage multiplier configured to receive the regulated voltage and to provide a boosted voltage higher in absolute value than the regulated voltage, wherein the voltage regulator includes a power transistor and a regulation transistor each having a first conduction terminal, a second conduction terminal and a control terminal, the first conduction terminals of the power transistor and of the regulation transistor being coupled to the supply terminal, and the second conduction terminal of the power transistor being coupled to the output terminal, the method comprising:

providing a clock signal periodically switching between the regulated voltage and a reference voltage;

alternately accumulating and transferring electric charge in a sequence of capacitive stages of the voltage multiplier according to the clock signal for generating the boosted voltage from the regulated voltage;

providing at least one feedback signal via feedback circuitry coupled to the second conduction terminal of the regulation transistor by at least enabling discharge circuitry and switching circuitry of capacitive circuitry having a capacitance corresponding to an equivalent capacitance of the voltage multiplier in operation as seen at the output terminal, in mutual exclusion according to the clock signal, the discharge circuitry discharging the capacitive circuitry to the reference voltage and the switching circuitry charging the capacitive circuitry by coupling the capacitive circuitry to the second terminal of the regulation transistor, and deriving the at least one feedback signal from the capacitive circuitry while the switching circuitry is enabled; and controlling the control terminals of the power transistor and of the regulation transistor according to the at least one feedback signal.

16. The method according to claim 15, wherein the voltage multiplier comprises a dual-branch charge pump; and wherein the capacitive circuitry has a capacitance corresponding to the equivalent capacitance of the voltage multiplier.

17. The method according to claim 15, wherein the voltage multiplier comprises a single-branch charge pump, the equivalent capacitance of the charge pump having a first value and a second value when the clock signal is equal to the regulated voltage and to the reference voltage, respectively; and wherein the feedback circuitry includes circuitry configured to vary the capacitance of the capacitive circuitry between the first value and the second value when the clock signal is equal to the regulated voltage and to the reference voltage, respectively.

18. A method of operating a voltage converter device comprising a voltage regulator having a supply terminal configured to receive a supply voltage and an output terminal configured to provide a regulated voltage, the voltage regulator including feedback circuitry configured to provide at least one feedback signal, and a voltage multiplier configured to receive the regulated voltage and configured to provide a boosted voltage based upon the regulated voltage, the feedback circuitry comprising capacitive circuitry having a capacitance corresponding to an equivalent capacitance of the voltage multiplier in operation as seen at the output terminal, the method comprising:

discharging the capacitive circuitry to the reference voltage using discharge circuitry;

charging the capacitive circuitry using switching circuitry;

enabling the discharge circuitry and the switching circuitry in mutual exclusion according to the a signal using control circuitry; and deriving the at least one feedback signal from the capacitive circuitry while the switching circuitry is enabled, using detection circuitry.

19. The method according to claim 18, wherein the voltage multiplier comprises a dual-branch charge pump; and wherein the capacitive circuitry has a capacitance corresponding to the equivalent capacitance of the voltage multiplier.

20. The method according to claim 18, wherein the voltage multiplier comprises a single-branch charge pump, the equivalent capacitance of the charge pump having a first value and a second value when the clock signal is equal to the regulated voltage and to the reference voltage, respectively; and wherein the feedback circuitry includes circuitry configured to vary the capacitance of the capacitive circuitry between the first value and the second value when the clock signal is equal to the regulated voltage and to the reference voltage, respectively.

* * * * *